United States Patent
Wane

(10) Patent No.: US 11,051,160 B2
(45) Date of Patent: *Jun. 29, 2021

(54) APPARATUSES, METHODS AND SYSTEMS FOR IMPLEMENTING A SYSTEM-ON-CHIP WITH INTEGRATED REPROGRAMMABLE CELLULAR NETWORK CONNECTIVITY

(71) Applicant: Simless, Inc., Palo Alto, CA (US)

(72) Inventor: Ismaila Wane, Mountain View, CA (US)

(73) Assignee: Simless, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,211

(22) Filed: Apr. 16, 2019

(65) Prior Publication Data

US 2019/0246266 A1    Aug. 8, 2019

Related U.S. Application Data

(63) Continuation-in-part of application No. 14/934,310, filed on Nov. 6, 2015, now Pat. No. 10,278,062, and
(Continued)

(51) Int. Cl.
*H04W 8/20* (2009.01)
*H04W 12/30* (2021.01)
(Continued)

(52) U.S. Cl.
CPC ........ *H04W 8/205* (2013.01); *G06F 9/45533* (2013.01); *G06F 21/64* (2013.01);
(Continued)

(58) Field of Classification Search
CPC .......... H04W 4/24; H04W 4/50; H04W 4/60; H04W 8/183; H04W 8/205; H04W 12/0023; H04W 12/04; H04W 12/06; H04W 88/02; H04W 84/042; H04W 88/06; H04B 1/3816; H04L 63/0861; H04L 67/30; H04L 67/306; H04M 15/56; H04M 15/63; H04M 15/7556; H04M 15/8038; G06F 9/45533; G06F 21/64
See application file for complete search history.

(56) References Cited

U.S. PATENT DOCUMENTS

2008/0064443 A1* 3/2008 Shin ................. H04M 1/72519
455/558
2011/0074005 A1* 3/2011 Jaeger .................... H01L 21/56
257/690

(Continued)

*Primary Examiner* — Dominic E Rego
(74) *Attorney, Agent, or Firm* — David Lewis

(57) ABSTRACT

Apparatuses, methods, and systems are provided for configuring a "SIM-less" System-on-Chip (S2oC) with integrated reprogrammable cellular network connectivity. Digitally issued Subscriber Identity Module (SIM) cards may be digitally issued by a remote server and downloaded and managed by the S2oC. A virtual SIM card container may be packaged in the S2oC and hosts an identity manager used by a plurality of applications residing in the multi-core processor of the S2oC. A virtual modem with a custom communication protocol allows the multi-core processor applications to exchange data with the virtual SIM card container.

24 Claims, 7 Drawing Sheets

Related U.S. Application Data a continuation-in-part of application No. 15/283,491, filed on Oct. 3, 2016, which is a continuation of application No. 15/040,425, filed on Feb. 10, 2016, now Pat. No. 9,485,252, application No. 16/386,211, which is a continuation-in-part of application No. 16/124,136, filed on Sep. 6, 2018, which is a continuation-in-part of application No. 14/856,991, filed on Sep. 17, 2015, now Pat. No. 10,075,841, said application No. 16/124,136 is a continuation-in-part of application No. 15/838,611, filed on Dec. 12, 2017, now Pat. No. 10,206,097, which is a continuation of application No. 15/040,410, filed on Feb. 10, 2016, now Pat. No. 9,860,740, application No. 16/386,211, which is a continuation-in-part of application No. 16/235,778, filed on Dec. 28, 2018, which is a continuation-in-part of application No. 15/838,611, filed on Dec. 12, 2017, now Pat. No. 10,206,097, which is a continuation of application No. 15/040,410, filed on Feb. 10, 2016, now Pat. No. 9,860,740, said application No. 16/235,778 is a continuation-in-part of application No. 16/124,136, filed on Sep. 6, 2018, which is a continuation-in-part of application No. 15/838,611, filed on Dec. 12, 2017, now Pat. No. 10,206,097, which is a continuation of application No. 15/040,410, filed on Feb. 10, 2016, now Pat. No. 9,860,740, said application No. 16/235,778 is a continuation-in-part of application No. 16/124,136, filed on Sep. 6, 2018, which is a continuation-in-part of application No. 14/856,991, filed on Sep. 17, 2015, now Pat. No. 10,075,841.

(60) Provisional application No. 62/078,006, filed on Nov. 11, 2014, provisional application No. 62/162,740, filed on May 16, 2015, provisional application No. 62/171,246, filed on Jun. 5, 2015, provisional application No. 62/051,311, filed on Sep. 17, 2014, provisional application No. 62/078,006, filed on Nov. 11, 2014.

(51) Int. Cl.

| | |
|---|---|
| *H04W 12/42* | (2021.01) |
| *H04W 4/60* | (2018.01) |
| *H04M 15/00* | (2006.01) |
| *H04M 17/00* | (2006.01) |
| *G06F 21/64* | (2013.01) |
| *G06F 9/455* | (2018.01) |
| *H04L 29/08* | (2006.01) |
| *H04W 84/04* | (2009.01) |
| *H04B 1/3816* | (2015.01) |
| *H04W 88/06* | (2009.01) |
| *H04W 8/18* | (2009.01) |
| *H04W 4/50* | (2018.01) |
| *H04W 12/06* | (2021.01) |
| *H04L 29/06* | (2006.01) |
| *H04W 12/04* | (2021.01) |
| *H04W 4/24* | (2018.01) |
| *H04M 17/02* | (2006.01) |
| *H04L 12/14* | (2006.01) |
| *G06F 21/77* | (2013.01) |
| *H04W 88/02* | (2009.01) |

(52) U.S. Cl.
CPC .......... *G06F 21/77* (2013.01); *H04B 1/3816* (2013.01); *H04L 12/14* (2013.01); *H04L 63/0861* (2013.01); *H04L 67/30* (2013.01); *H04L 67/306* (2013.01); *H04M 15/00* (2013.01); *H04M 15/47* (2013.01); *H04M 15/56* (2013.01); *H04M 15/63* (2013.01); *H04M 15/7556* (2013.01); *H04M 15/8038* (2013.01); *H04M 17/00* (2013.01); *H04M 17/02* (2013.01); *H04W 4/24* (2013.01); *H04W 4/50* (2018.02); *H04W 4/60* (2018.02); *H04W 8/183* (2013.01); *H04W 12/04* (2013.01); *H04W 12/06* (2013.01); *H04W 12/35* (2021.01); *H04W 84/042* (2013.01); *H04W 88/06* (2013.01); *H04W 88/02* (2013.01)

(56) References Cited

U.S. PATENT DOCUMENTS

| | | | | |
|---|---|---|---|---|
| 2012/0108206 | A1* | 5/2012 | Haggerty | H04W 8/183 455/411 |
| 2013/0046972 | A1* | 2/2013 | Campagna | H04L 9/0841 713/156 |
| 2013/0047212 | A1* | 2/2013 | Fang | G06F 13/102 726/3 |
| 2013/0208671 | A1* | 8/2013 | Royz | H04L 25/00 370/329 |
| 2013/0294041 | A1* | 11/2013 | Syal | H05K 1/0275 361/764 |
| 2014/0220981 | A1* | 8/2014 | Jheng | H04W 36/0011 455/437 |
| 2015/0081884 | A1* | 3/2015 | Maguire | H04L 45/70 709/224 |
| 2015/0163840 | A1* | 6/2015 | Ji | H04W 8/005 455/552.1 |
| 2016/0149877 | A1* | 5/2016 | Kancharla | H04L 63/062 713/171 |

\* cited by examiner

APPARATUSES, METHODS AND SYSTEMS FOR IMPLEMENTING A SYSTEM-ON-CHIP WITH INTEGRATED REPROGRAMMABLE CELLULAR NETWORK CONNECTIVITY

CROSS-REFERENCE TO RELATED APPLICATIONS

This application is a continuation-in-part of U.S. patent application Ser. No. 14/934,310, filed Nov. 6, 2015, by Ismaila Wane, entitled "Apparatuses, Methods and Systems for Implementing a System-On-Chip with Integrated Reprogrammable Cellular Network Connectivity", which claims priority benefit of U.S. Provisional Patent Application No. 62/078,006, filed Nov. 11, 2014, by Ismaila Wane, entitled, "Methods for a System-On-Chip with Integrated Reprogrammable Cellular Network Connectivity", claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 14/856,991, filed Sep. 17, 2015, U.S. Pat. No. 10,075,841, issued on Sep. 11, 2018, by Ismaila Wane, entitled, "Apparatuses, Methods and Systems for Implementing a Trusted Subscription Management Platform", which claims priority benefit of U.S. Provisional Patent Application No. 62/051,311, filed Sep. 17, 2014, by Ismaila Wane, entitled, "Apparatus, Methods and System for a Trusted Subscription Management Platform", claims priority benefit of U.S. Provisional Patent Application No. 62/078,006, filed Nov. 11, 2014, by Ismaila Wane, entitled, "Methods for a System-On-Chip with Integrated Reprogrammable Cellular Network Connectivity", claims priority benefit of U.S. Provisional Patent Application No. 62/162, 740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 14/856,974, filed Sep. 17, 2015, U.S. Pat. No. 9,949,111, issued on Apr. 17, 2018, by Ismaila Wane, entitled "Apparatuses, Methods and Systems for Interfacing with a Trusted Subscription Management Platform", which claims priority benefit of U.S. Provisional Patent Application No. 62/051,311, filed Sep. 17, 2014, by Ismaila Wane, entitled, "Apparatus, Methods and System for a Trusted Subscription Management Platform", claims priority benefit of U.S. Provisional Patent Application No. 62/078,006, filed Nov. 11, 2014, by Ismaila Wane, entitled, "Methods for a System-On-Chip with Integrated Reprogrammable Cellular Network Connectivity", claims priority benefit of U.S. Provisional Patent Application No. 62/162, 740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 15/040,425, filed Feb. 10, 2016, U.S. Pat. No. 9,485,252, issued on Nov. 1, 2016, by Ismaila Wane, entitled "Apparatuses, Methods and Systems for Virtualizing a Reprogrammable Universal Integrated Circuit Chip", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 15/040,410, filed Feb. 10, 2016, U.S. Pat. No. 9,860,740, issued on Jan. 2, 2018, by Ismaila Wane, entitled "Apparatuses, Methods and Systems for Configuring a Trusted Java Card Virtual Machine Using Biometric Information", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171, 246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 15/283,491, filed Oct. 3, 2016, by Ismaila Wane, entitled "Apparatuses, Methods and Systems for Virtualizing a Reprogrammable Universal Integrated Circuit Chip", which is a continuation of U.S. patent application Ser. No. 15/040,425, filed Feb. 10, 2016, U.S. Pat. No. 9,485,252, issued on Nov. 1, 2016, by Ismaila Wane, entitled "Apparatuses, Methods and Systems for Virtualizing a Reprogrammable Universal Integrated Circuit Chip", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 15/838,611, filed Dec. 12, 2017, U.S. Pat. No. 10,206,097, issued on Feb. 12, 2019, by Ismaila Wane, entitled "Apparatuses, Methods and Systems for Configuring a Trusted Java Card Virtual Machine Using Biometric Information", which is a continuation of U.S. patent application Ser. No. 15/040,410, filed Feb. 10, 2016, U.S. Pat. No. 9,860,740, issued on Jan. 2, 2018, by Ismaila Wane, entitled "Apparatuses, Methods and Systems for Configuring a Trusted Java Card Virtual Machine Using Biometric Information", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171, 246, filed Jun. 5, 2015, by Ismaila Wane, entitled, "Method for Configuring a Trusted Java Card Virtual Machine Using Biometric Information";

this application is also a continuation-in-part of U.S. patent application Ser. No. 16/124,136, filed Sep. 6, 2018, by Ismaila Wane, entitled, "Apparatuses, Methods and Systems for Implementing a Trusted Subscription Management Platform", which is a continuation-in-part of U.S. patent application Ser. No. 15/838,611, filed Dec. 12, 2017, U.S. Pat. No. 10,206,097, issued on Feb. 12, 2019, by Ismaila Wane, entitled, "Apparatuses, Methods and Systems for Configuring a Trusted Java Card Virtual Machine Using Biometric Information", which is a continuation of U.S. patent application Ser. No. 15/040,410, filed Feb. 10, 2016, U.S. Pat. No. 9,860,740, issued on Jan. 2, 2018, by Ismaila Wane, entitled, "Apparatuses, Methods and Systems for Configuring a Trusted Java Card Virtual Machine Using Biometric Information", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information", U.S. patent application Ser. No. 16/124,136, filed Sep. 6, 2018, by Ismaila Wane, entitled, "Apparatuses, Methods and Systems for Implementing a Trusted Subscription Management Platform" is a continuation-in-part of U.S. patent application Ser. No. 14/856,991, filed Sep. 17, 2015, U.S. Pat. No. 10,075,841, issued on Sep. 11, 2018, by Ismaila Wane, entitled "Apparatuses, Methods and Systems for Implementing a Trusted Subscription Management Platform", which claims priority benefit of U.S. Provisional Patent Application No. 62/051,311, filed Sep. 17, 2014, by Ismaila Wane, entitled, "Apparatus, Methods and System for a Trusted Subscription Management Platform", claims priority benefit of U.S. Provisional Patent Application No. 62/078,006, filed Nov. 11, 2014, by Ismaila Wane, entitled, "Methods for a System-On-Chip with Integrated Reprogrammable Cellular Network Connectivity", claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information", U.S. patent application Ser. No. 16/124,136, filed Sep. 6, 2018, by Ismaila Wane, entitled, "Apparatuses, Methods and Systems for Implementing a Trusted Subscription Management Platform" is a continuation-in-part of U.S. patent application Ser. No. 15/838,611, filed Dec. 12, 2017, U.S. Pat. No. 10,206,097, issued on Feb. 12, 2019, by Ismaila Wane, entitled, "Apparatuses, Methods and Systems for Configuring a Trusted Java Card Virtual Machine Using Biometric Information", which is a continuation of U.S. patent application Ser. No. 15/040,410, filed Feb. 10, 2016, U.S. Pat. No. 9,860,740, issued on Jan. 2, 2018, by Ismaila Wane, entitled, "Apparatuses, Methods and Systems for Configuring a Trusted Java Card Virtual Machine Using Biometric Information", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information".

this application is also a continuation-in-part of U.S. patent application Ser. No. 16/235,778, filed Dec. 28, 2018, by Ismaila Wane, entitled "Apparatuses, Methods, and Systems for Configuring a Trusted Java Card Virtual Machine Using Biometric Information", which is a continuation-in-part of U.S. patent application Ser. No. 15/838,611, filed Dec. 12, 2017, U.S. Pat. No. 10,206,097, issued on Feb. 12, 2019, by Ismaila Wane, entitled "Apparatuses, Methods and Systems for Configuring a Trusted Java Card Virtual Machine Using Biometric Information", which is a continuation of U.S. patent application Ser. No. 15/040,410, filed Feb. 10, 2016, U.S. Pat. No. 9,860,740, issued on Jan. 2, 2018, by Ismaila Wane, entitled, "Apparatuses, Methods and Systems for Configuring a Trusted Java Card Virtual Machine Using Biometric Information", which claims priority benefit of U.S. Provisional Patent Application No. 62/162,740, filed May 16, 2015, by Ismaila Wane, entitled "Method for Virtualizing a Reprogrammable Universal Integrated Circuit Chip on an Application Processor", and claims priority benefit of U.S. Provisional Patent Application No. 62/171,246, filed Jun. 5, 2015, by Ismaila Wane, entitled, "Method for Configuring a Trusted Java Card Virtual Machine Using Biometric Information".

The entire contents of each of the above applications are incorporated herein by reference.

This application is also related to U.S. Provisional Patent Application No. 62/051,311, filed Sep. 17, 2014.

The entire contents of all of the above applications are incorporated herein by reference.

TECHNOLOGICAL FIELD

Example embodiments of the present invention relate generally to the fields of semiconductors and telecommunications, and more particularly, to the design and implementation of embedded systems within cellular equipment configured to utilize virtualized Subscription Identity Module (SIM) cards to access one or more cellular networks.

BACKGROUND

There will be over 50 billion connected devices in the so-called Internet of Things (IoT) by 2020, according to various industry reports. Access to the Internet will be generally facilitated via cellular networks through physical SIM cards integrated into these IoT devices.

OEMs that want to add connectivity functionality into devices will therefore need to design applications that are aware of device capabilities to capture sensor data and communicate with a remote server for an application-specific task. Using conventional methods, this would require procuring and integrating physical SIM cards into the potential billions of devices manufactured. These physical SIM cards would generally require wireless modules that are integrated into the Printed Circuit Boards (PCBs) of these devices. A wireless module and physical SIM will increase the bill of materials (BoM) of such devices. Furthermore, an OEM manufacturer will need to find and select a mobile network operator (MNO) that will provide coverage in the geographic areas that the connected devices will be deployed. The selection process may depend on various parameters such as pricing, network quality, coverage, etc. However, as there are thousands of cellular network operators in the world with an average of 4 or more cellular network operator in many countries, the discovery and selection process becomes quickly very challenging for these OEMs and/or third party entities managing the access to connectivity for these devices. The third party entities could be either enterprises or consumers who own these connected devices may be interchangeably referred to herein as the owners of the connected (or IoT) devices.

In view of the above issues, there is a clear friction in accessing local cellular networks faced by consumers and enterprises managing connected devices in a global market where people and things are fundamentally mobile.

SIM cards have evolved other the past few years and their form factors will ineluctably change further in the future. From the standard 2FF card (mini-SIM) to the 4FF card (nano-SIM), it has now evolved to the MFF2 form factor, which is mainly used in machine-to-machine (M2M) applications. Introduction of the MFF2 form factor and its subsequent smaller iterations into the Internet of Things (IoT) could radically alter the manufacturing and deployment of IoT devices.

In December of 2013, the GSM Association (GSMA), which is the largest association of mobile operators and related companies, essentially standardized how reprogrammable SIM cards are architected and remotely provisioned. As a result of the standardization efforts, many new use cases will be soon possible in an interoperable manner. These use cases include the ability to seamlessly select and switch cellular networks without physically changing SIM cards.

Although the GSMA's specifications were developed primarily for M2M devices, nothing prevents those skilled in the art from using them for other types of connected devices. Doing so would therefore remove the current friction of switching networks faced by people and things in international roaming situations or in local geographic areas with multiple cellular carriers. This provides people and devices with the ability to dynamically change cellular networks to extract the best value for mobile communication needs based on preferences for price, data speed, network quality, etc. The virtualization of physical SIM cards could therefore revolutionize the Internet of Things.

For local telecom regulators, virtual SIM card technology lowers the barriers to switching networks and thereby fosters a healthy and competitive telecommunications landscape in which MNOs and MVNOs compete on price, service quality and innovation.

For OEMs, virtual SIM card technology provides more space in the printed circuit board assembly (PCBA) design, allowing the incorporation of additional sensors or other chip components and hence optimizes the PCB layout. It also removes the complexity of dealing with various SIM card vendors approved by MNOs in "kitting" environments. Furthermore, it could be a key differentiator for early adopters in the highly competitive IoT/M2M market.

MNOs stand to immensely benefit from virtual SIM card technology as well. The technology may facilitate enhanced distribution because M(V)NO service discovery, selection and provisioning could all take place remotely over the "cloud." Such a mobile application could then help effectively streamline the redundant Know Your Customer (KYC) procedures currently in effect in many countries. Moreover, for all M(V)NOs, regardless of market position, this technology can eliminate the costs of procuring, testing, certifying and distributing physical SIM cards by removing the inherent logistical complexities associated with managing physical SIM cards. This will enable MNOs to better focus capital spend and management attention on network capacity, coverage and other differentiated services. Ultimately, this technology may reduce the current cost of acquiring and retaining subscribers, potentially improving thus the bottom line for M(V)NOs.

Finally, virtual SIM card technology may provide important environmental benefits by lowering the overall volume of manufactured SIM cards globally. It remains unclear if most of the billions of SIM cards produced each year are still not halogen-free as halogen is toxically corrosive, which therefore has the potential to damage people's health and their environment.

BRIEF SUMMARY

Example connected devices described herein may comprise secure mobile equipment with various sensors (e.g. gyroscope, accelerometer, camera, thermometer, etc.). These connected devices may remotely communicate with a dedicated backend application running a service specific to the devices' deployment. These connected devices may be configured to communicate with a subscription management platform for provisioning and management of virtual SIM cards.

In example embodiments, these IoT devices are contemplated to operate without an on-site human operator. For instance, an example of such a device may be able to download and use a plurality of concurrent virtual SIM cards either by itself or via an off-site (remote) human operator. Such an IoT device may work in conjunction with a subscription management server, and in some embodiments may be connected to one or more backend servers for application specific tasks (IoT Applications). In turn, the subscription management server may be composed of various components facilitating the secure creation, provisioning and management of virtual SIM cards. Inside an IoT device's chassis is a PCB which contains the main chip that contains all the device's operating system and applications. This chip is referred as to the system-on-chip. As disclosed in greater detail below, example embodiments of the present invention describe a system-on-chip from both hardware and software perspectives, as well as the configurations and methods by which a virtual SIM card container is integrated. This integration, which enables use of a virtual SIM card by a system-on-chip, may hereafter be referred as a SIM-less System on Chip, or S2oC.

In a first example embodiment, an apparatus is provided. The apparatus includes a multi-core processor, a software-based embedded Universal Integrated Circuit Card (eUICC), and one or more memories storing computer-executable instructions that, when executed by the multi-core processor, configure the apparatus to communicate with a plurality of cellular networks using one or more virtual subscriber identity module (SIM) cards stored in the software-based eUICC.

In some embodiments, the software-based eUICC comprises an on-die eUICC. In some embodiments, the cellular modem comprises a virtual cellular modem, while in other embodiments the cellular modem includes a dedicated hardware element.

In some embodiments, the cellular modem comprises a software-based modulator-demodulator device which allows communication by the connected device over a cellular network. Additionally or alternatively, the apparatus may include a virtual bus system configured to transmit communications between a plurality of multi-core processor applications using a high-level programming interface.

In some embodiments, the one or more memories further store computer-executable instructions that, when executed by the multi-core processor, cause the integrated circuit chip to self-provision virtual SIM cards accessible over-the-air by cellular network operators. In one such embodiment, the computer-executable instructions, when executed by the multi-core processor, cause the apparatus to self-provision virtual SIM cards accessible over-the-air by cellular network operators using a local certificate stored in the software-based eUICC. Additionally or alternatively, the apparatus is assigned a unique random cryptographic key only known by a remote server upon registration of said chip.

In some embodiments, the one or more memories further store computer-executable instructions that, when executed by the multi-core processor, cause the apparatus to dynamically switch cellular networks without human intervention.

In another example embodiment, a method is provided for performance by a device having an integrated circuit chip including a multi-core processor, a cellular modem, and a software-based embedded Universal Integrated Circuit Card (eUICC), and one or more memories. The method includes communicating, using the cellular modem, with a plurality of cellular networks using one or more virtual subscriber identity module (SIM) cards stored in the software-based eUICC.

In some embodiments, the software-based eUICC comprises an on-die eUICC. In some embodiments, the cellular modem comprises a virtual cellular modem, while in other embodiments the cellular modem includes a dedicated hardware element.

In some embodiments, the cellular modem comprises a software-based modulator-demodulator device which allows communication by the connected device over a cellular network. Additionally or alternatively, the method may include transmitting, by a virtual bus system, communications between a plurality of multi-core processor applications using a high-level programming interface.

In some embodiments, the method further includes self-provisioning virtual SIM cards accessible over-the-air by cellular network operators. In one such embodiment, the self-provisioning of the virtual SIM cards accessible over-the-air by cellular network operators uses a local certificate stored in the software-based eUICC. Additionally or alternatively, said integrated circuit chip may be assigned a unique random cryptographic key only known by a remote server upon registration of said chip.

In some embodiments, the method further includes dynamically switching between cellular networks without human intervention.

In yet another example embodiment, an apparatus is provided that includes an integrated circuit chip including a multi-core processor, a software-based embedded Universal Integrated Circuit Card (eUICC), and one or more memories. The apparatus further includes means for communicating with a plurality of cellular networks using one or more virtual subscriber identity module (SIM) cards stored in the software-based eUICC.

In some embodiments, the software-based eUICC comprises an on-die eUICC. In some embodiments, the means for communicating with the plurality of cellular networks comprises a cellular modem, which in some embodiments may comprise a virtual cellular modem, while in other embodiments may comprise a dedicated hardware element.

In some embodiments, the virtual modem comprises a software-based modulator-demodulator device which allows communication by the connected device over a cellular network. Additionally or alternatively, the apparatus may include means for transmitting communications between a plurality of multi-core processor applications using a high-level programming interface.

In some embodiments, the apparatus further includes means for self-provisioning virtual SIM cards accessible over-the-air by cellular network operators. In one such embodiment, the self-provisioning of the virtual SIM cards accessible over-the-air by cellular network operators uses a local certificate stored in the software-based eUICC. Additionally or alternatively, said integrated circuit chip may be assigned a unique random cryptographic key only known by a remote server upon registration of said chip.

In some embodiments, the apparatus further includes means for dynamically switching between cellular networks without human intervention.

The above summary is provided merely for purposes of summarizing some example embodiments to provide a basic understanding of some aspects of the present invention(s). Accordingly, it will be appreciated that the above-described embodiments are merely examples and should not be construed to narrow the scope or spirit of the invention in any way. It will be appreciated that the scope of the invention(s) encompasses many potential embodiments in addition to those here summarized, some of which will be further described below.

BRIEF DESCRIPTION OF THE DRAWINGS

Figure 1:
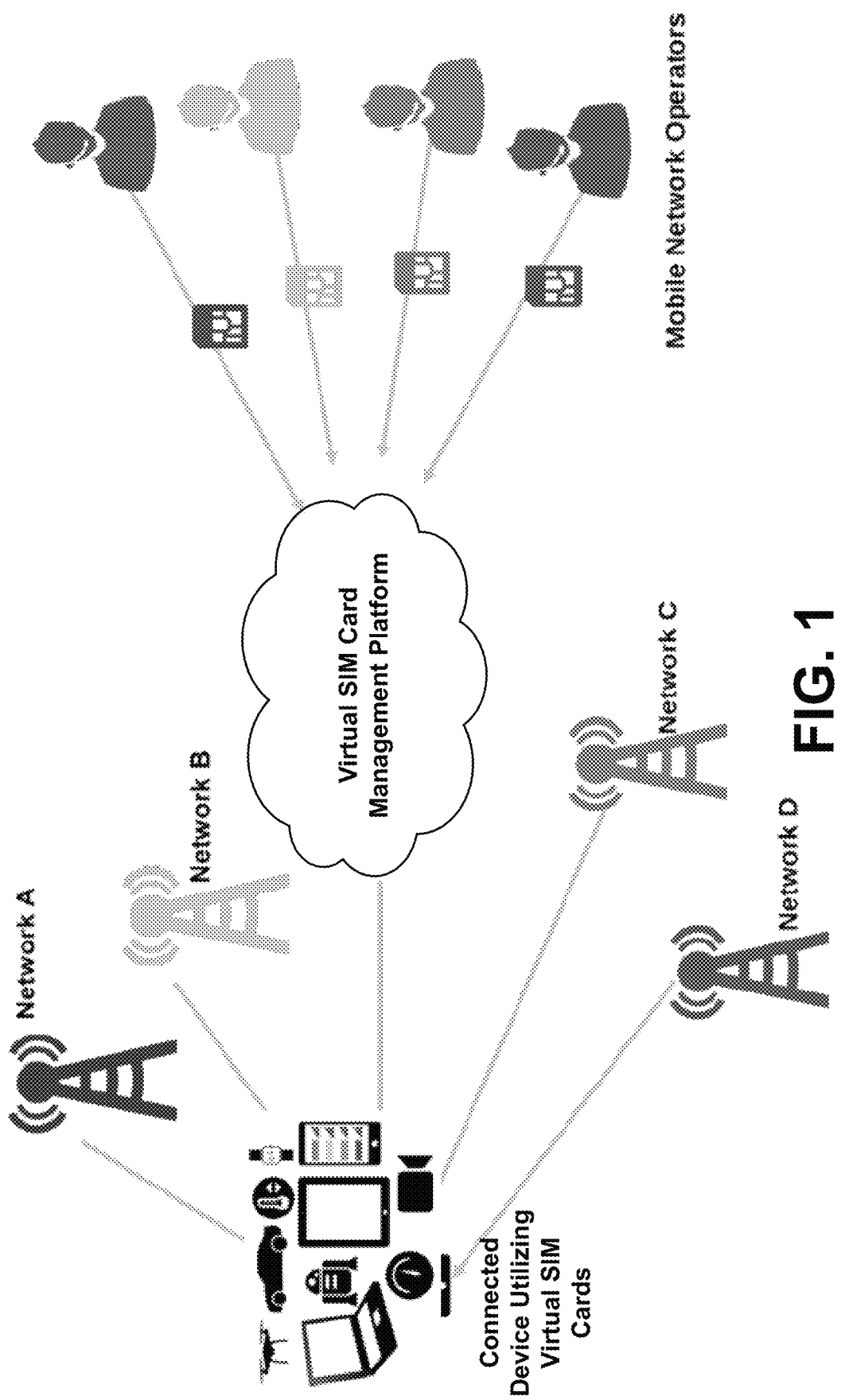
Figure 2:
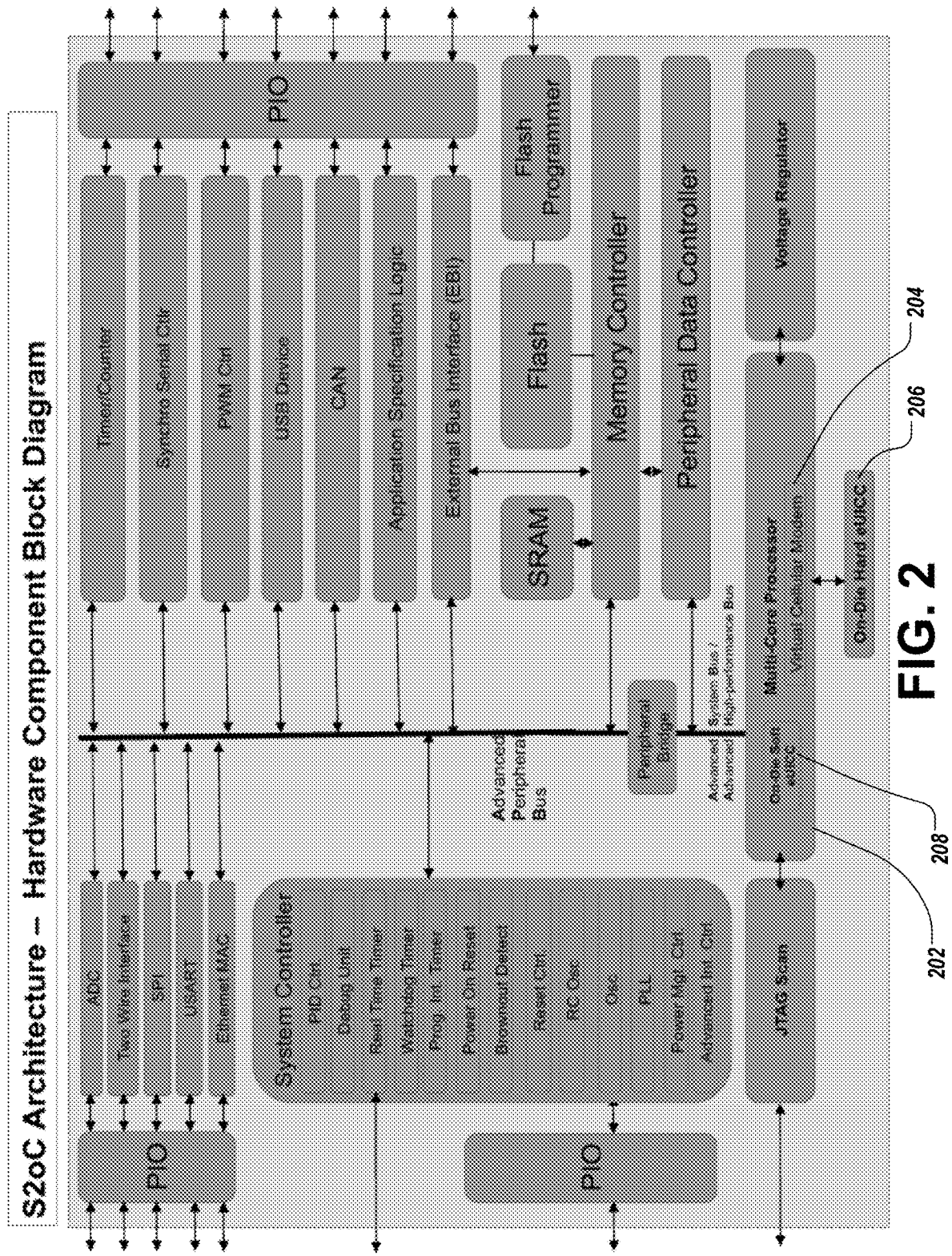
Figure 3:
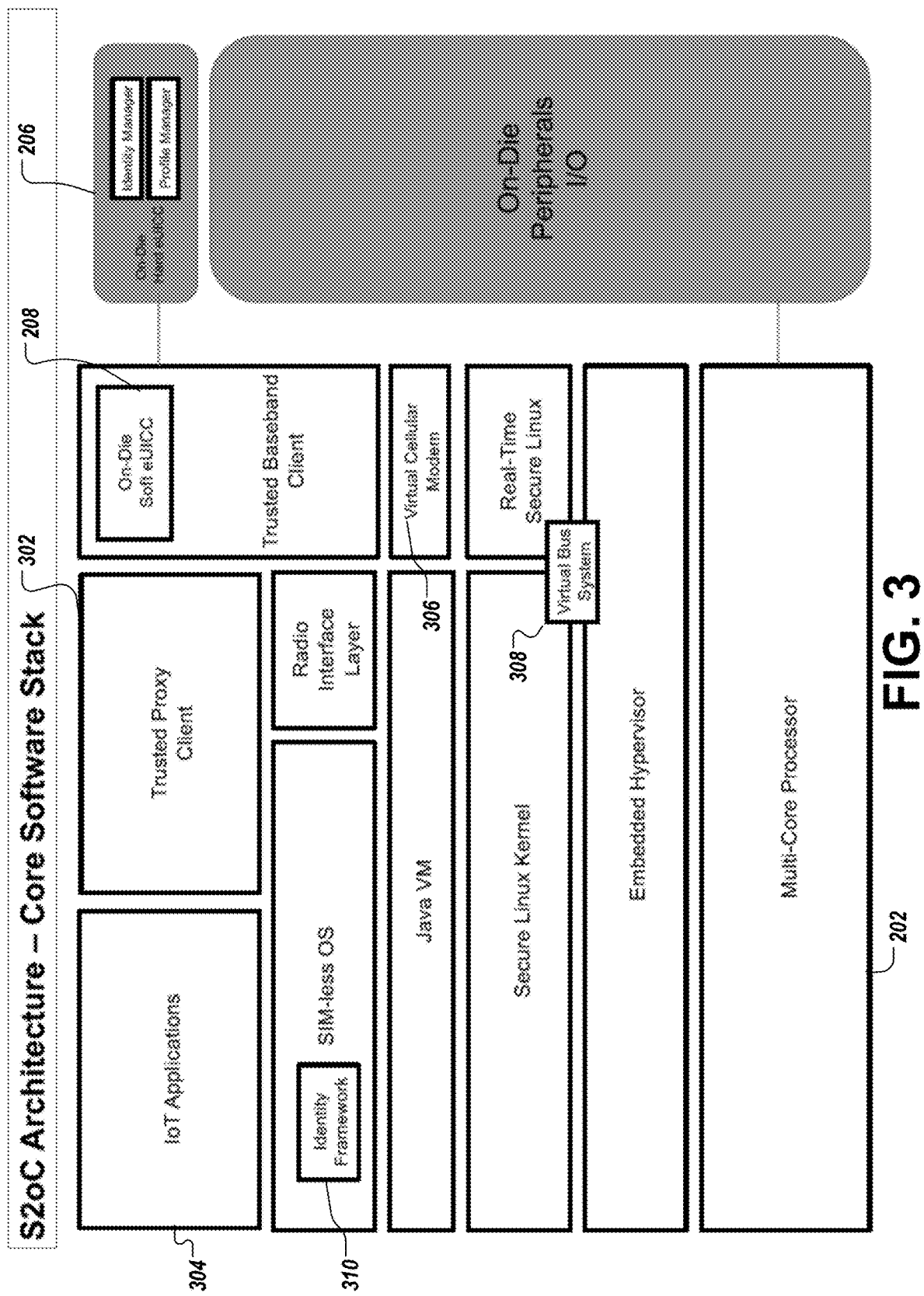
Figure 4:
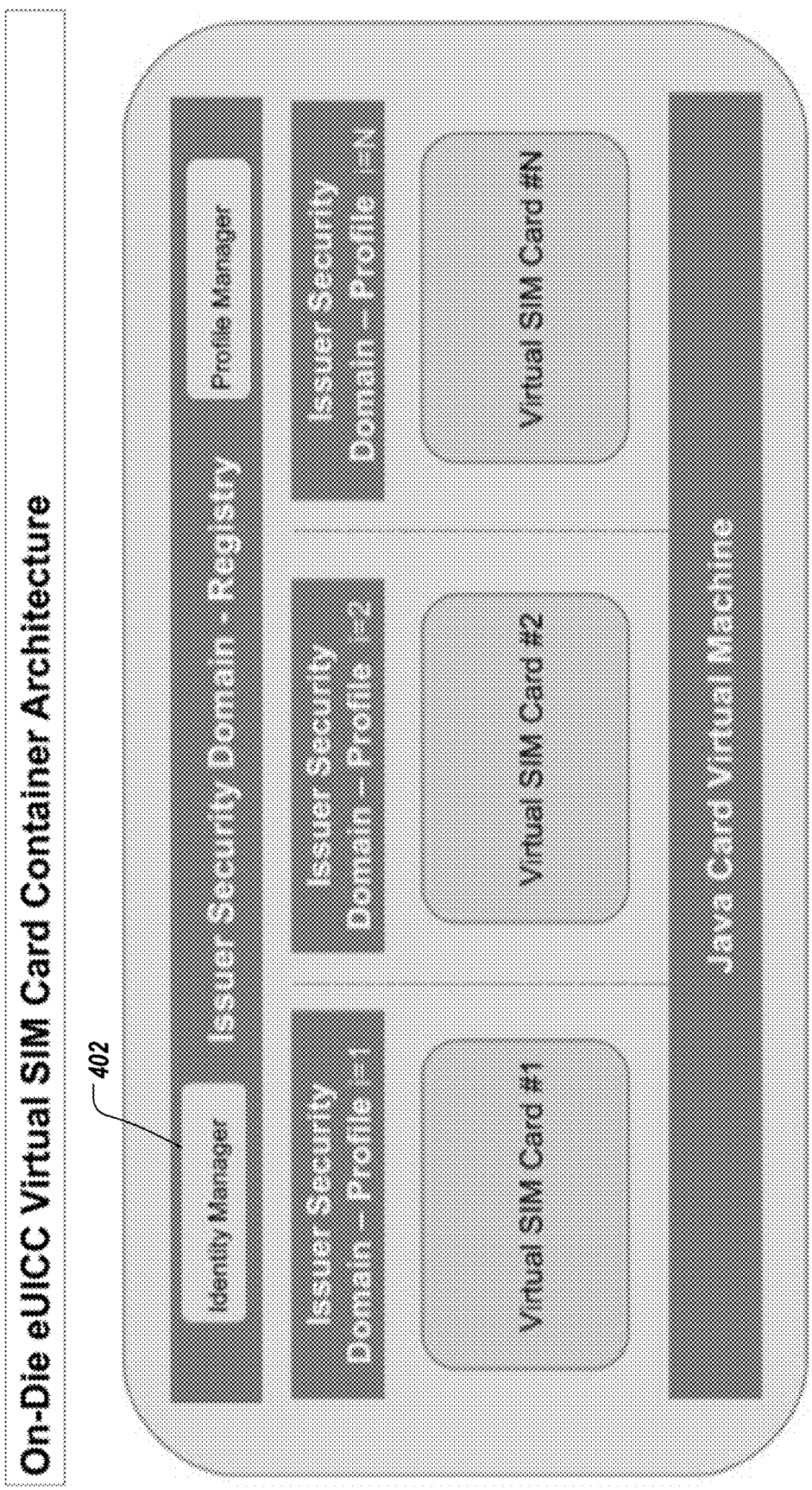
Figure 5:
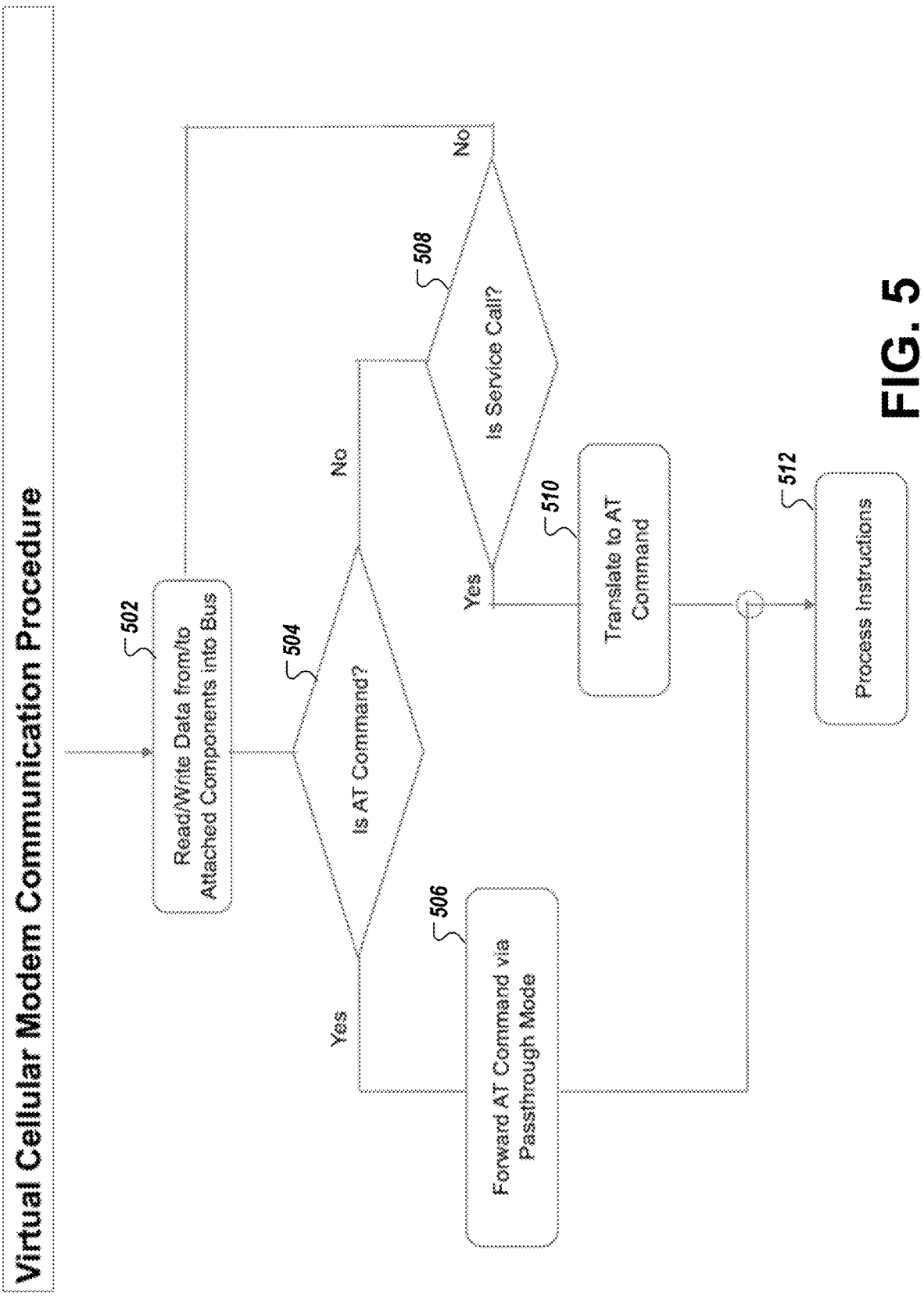
Figure 6:
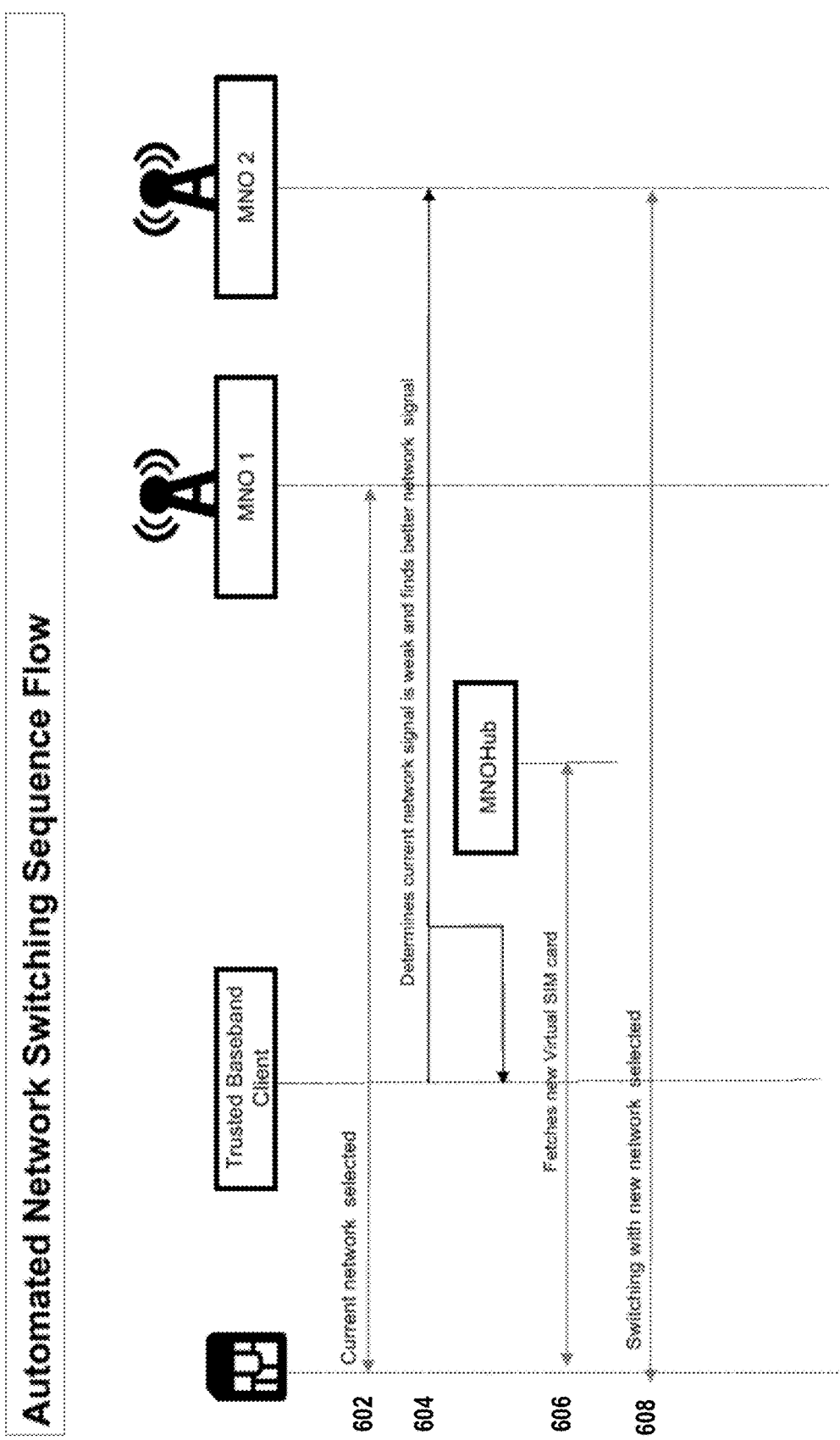
Figure 7:
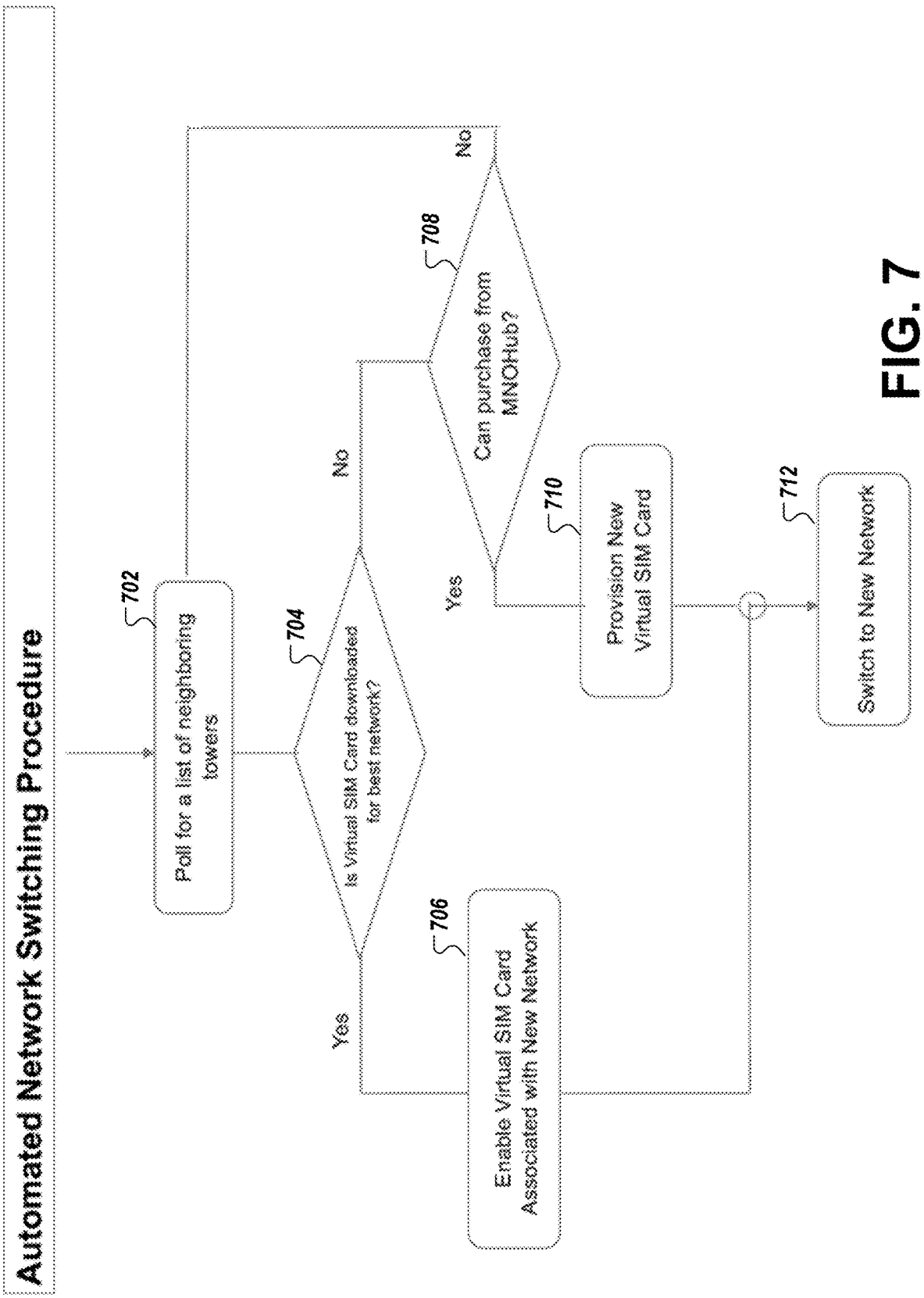

Having thus described the example embodiments of the invention in general terms, reference will now be made to the accompanying drawings, which are not necessarily drawn to scale, and wherein:

FIG. 1 provides a high-level system overview of an end-to-end virtual SIM platform, in accordance with example embodiments described herein;

FIG. 2 illustrates a hardware component block diagram of the S2oC, in accordance with example embodiments described herein;

FIG. 3 illustrates the core software stack of S2oC, in accordance with example embodiments described herein;

FIG. 4 illustrates the software architecture of the on-die eUICC, in accordance with example embodiments described herein;

FIG. 5 illustrates a procedure for communication with the virtual modem, in accordance with example embodiments described herein;

FIG. 6 illustrates a procedure for an automated network switching, in accordance with example embodiments described herein; and FIG. 7 illustrates a sequence flow for an automated network, in accordance with example embodiments described herein.

DETAILED DESCRIPTION

Some embodiments will now be described more fully hereinafter with reference to the accompanying drawings, in which some, but not necessarily all contemplated embodiments are expressly illustrated. Indeed, the inventions contemplated herein may be embodied in many different forms and should not be construed as limited to the embodiments set forth herein; rather, these embodiments are provided so that this disclosure will satisfy applicable legal requirements. Like numbers refer to like elements throughout.

As defined herein, a "computer-readable storage medium," which refers to a non-transitory physical storage medium (e.g., volatile or non-volatile memory device), can be differentiated from a "computer-readable transmission medium," which refers to an electromagnetic signal.

It will be understood that each software operation described herein may be implemented by various means, such as hardware, firmware, processor, circuitry, and/or other devices associated with execution of software including one or more computer program instructions. For example, one or more of the procedures described herein may be embodied by computer program instructions. In this regard, the computer program instructions which embody the described procedures may be stored by a memory of an apparatus and executed by a processor of the apparatus. As will be appreciated, any such computer program instructions may be loaded onto a computer or other programmable apparatus (e.g., hardware) to produce a machine, such that the resulting computer or other programmable apparatus implements the particular functions specified. These computer program instructions may also be stored in a computer-readable memory (e.g., a computer-readable storage medium) that may direct a computer or other programmable apparatus to operate in a particular manner, such that the instructions stored in the computer-readable memory produce an article of manufacture, the execution of which implements the specified functions. The computer program instructions may also be loaded onto a computer or other programmable apparatus to cause a series of operations to be performed on the computer or other programmable apparatus to produce a computer-implemented process such that the computer program instructions executed on the computer or other programmable apparatus cause the performance of operations for implementing the specified functions.

Turning first to FIG. 1, a high-level system overview of an end-to-end virtual SIM platform is illustrated. As shown in FIG. 1, embodiments contemplated herein enable a single device (that may itself be a connected device such as a smartphone, laptop, tablet, drone, vehicle, thermostat, watch, or the like) to connect to a plurality of different networks (e.g., Networks A through D) using a series of virtual SIM cards stored in an eUICC. In turn, a virtual SIM card management platform (referred to herein as an MNOHub server) facilitates the provisioning (e.g., purchase, activation, deactivation, and deletion, or the like) of the virtual SIM cards. The virtual SIM card management platform further communicates with a variety of MNOs or MVNOs associated with several of the networks available to the device and that offer the various virtual SIM cards for sale.

As described herein, example embodiments include apparatuses, systems and a set of methods for virtualizing physical SIM cards using a plurality of concurrent eUICCs (embodied in software and/or hardware). In this regard, example embodiments may comprise connected devices such as IoT devices. It should be understood that alternative embodiments utilizing virtual SIM cards may be mobile stations that may comprise cellular telephones or which may otherwise be operated by users, as disclosed in U.S. Non-Provisional patent application Ser. No. 14/856,974, filed Sep. 17, 2015, the entire contents of which are incorporated herein by reference. In many of the above embodiments, example mobile stations or connected devices may comprise a "SIM-less" System-on-Chip (S2oC) with integrated reprogrammable cellular network connectivity, although particular examples of S2oC architecture are described below in connection with connected devices that may, for instance, comprise IoT devices.

An example connected device may generally have multiple sensors attached as peripherals (e.g., a camera, a gyroscope, etc.) and may further include network access capabilities. Upon purchase of the connected device, the owner is required to have identity verification performed before the device is activated, due to KYC procedures enforced by a cellular platform operator. In one example, the owner can present his state or national ID card at the point of sale. The merchant can then use a dashboard connected to the virtual SIM card management platform to activate both the account and the device, as described in greater detail in U.S. Non-Provisional patent application Ser. No. 14/856,974, filed Sep. 17, 2015.

For connected devices such as IoT devices that do not need to interface with a user, example embodiments contemplated herein may instead pre-install a trusted proxy client 302 into the connected device, as shown in FIG. 3. The trusted proxy client 302 can exchange data with the MNOHUB server through HTTPS and/or secure socket connections. The trusted proxy client 302 allows the connected device to download additional virtual SIM cards and other items (e.g. prepaid plans, software for implementing IoT Applications 304, or the like) from a trusted virtual store associated with the MNOHUB server.

The trusted virtual store may be a digital marketplace where virtual SIM cards are displayed for purchase based on the MNOs' campaign requirements. These campaign requirements may include images, profile data (IMSIs, static/dynamic Kis, binaries of applets, GSM file definition), unit price, discounts, eligibility, location, effective date, expiration date, etc. While devices that provide a trusted UI client may provide visual indicators of current local signal strengths, embodiments for connected devices such as IoT devices will often not rely upon a trusted UI client, and thus may not provide a user interface for active user network selection. Instead, such embodiments may provide the connected device with a list of the available virtual SIM cards from the MNOHUB server, and the connected device may use filters based on location, current local signal strengths, or the like to identify a virtual SIM card (and corresponding network) to utilize. The filtering process may generally rely on the multi-active mode of the connected device, which can provide the signal strengths for all nearby cell towers. The signal information is more specifically provided by a trusted baseband client of the connected device based on its lowlevel implementation of digital signal processing (e.g., GSM stack) and access to a virtual modem (discussed below) and an RF antenna.

In response to the connected device selecting an item for purchase, the trusted virtual store determines if the item is free of charge (e.g. $0) or not. If the item is not free of charge, the trusted virtual store uses the billing information (prepaid credits, credit card on file, etc.) associated with an owner of the connected device to charge for the transaction. Upon success of the transaction, it carries on the default procedure for installing a free item. This procedure allows download of the .sim file by the trusted proxy client 302 in similar fashion as described in connection with the downloading of a .sim file by a trusted UI client in U.S. Non-Provisional patent application Ser. No. 14/856,974, filed Sep. 17, 2015. The file may then be unarchived locally in a directory including all the assets and metadata of said virtual SIM card. Network attributes are then parsed from the directory files and passed to the trusted baseband client. The trusted proxy client 302 then triggers a proxy procedure by which the MNOHUB server sends personalization commands to a profile manager. These commands may, for instance, be coded as Application Protocol Data Units (APDUs), according to the message format defined in ISO 7816-4.

The trusted proxy client 302 may be an Android application using SEEK's SmartCard API which implements GSMA's Open Mobile API specifications. It may also be a Java ME or any client application provided it has the corresponding Application Programming Interfaces (APIs) used by its Android counterpart.

The trusted proxy client 302 is granted access to the eUICC and has access control rules set up enabling it to securely and confidentially communicate with a profile manager. As previously described, the trusted proxy client 302 provides a proxy functionality facilitating communication between the MNOHUB server and a profile manager for installing, deleting or updating virtual SIM cards.

Authentication prior to the connected device using the trusted proxy client 302 is at least password-based. However, another mode of authentication may utilize a local certificate stored in the eUICC (which may, in some embodiments, be managed by an identity manager, in a similar fashion as virtual SIM cards are managed by the profile manager). This facilitates the secure self-provisioning of virtual SIM cards.

Similarly, authentication for an IoT Application 304 involves the use of identity framework 310 (e.g., a series of APIs that enable communication with the identity manager) to provide the IoT Application 304 with the ability for self-authentication via a local certificate managed by the identity manager.

The MNOHUB server and a profile manager may use a mutual authentication procedure to create a secure communication channel (e.g. SCP 02 or SCP 03) before the profile manager can confidently execute a transaction. In the above example, the transaction is an installation. To this end, the profile manager associated with a connected device may be hosted on a hardware or hardware-based eUICC (although a software implementation of an eUICC for a connected device is also contemplated in some embodiments).

Upon registration of a given connected device, the MNOHUB server triggers the OTA installation of the profile manager and assigns randomly generated Profile Keys (PKs) to the instance of an identity manager 402 associated with the profile manager. Alternatively, if the profile manager is pre-installed, the MNOHUB server may elect to change the PKs in the manner described previously. FIG. 4 illustrates an example software architecture of an on-die eUICC, which is similar to the architecture described in connection with FIGS. 4A and 4B of U.S. Non-Provisional patent application Ser. No. 14/856,974, filed Sep. 17, 2015. However, it should be understood that in FIG. 4 of the present application, an identity manager 402 is also deployed in the eUICC. In some embodiments, the identity manager functionality may be integrated directly into the profile manager. The identity manager 402 provides an authentication service to all IoT Applications 304 through the SIM-less OS.

As also described above, once each profile manager is post-personalized into the eUICC, the MNOHUB server is the only entity capable of exchanging data with them as a mutual-authentication procedure is always required before any transaction (CREATE PROFILE, INSTALL PROFILE, DELETE PROFILE, etc.) can be performed. Such a rule could be further enforced by an access control mechanism (e.g., PKCS #15) within the operating system of the connected device to prevent an unauthorized application to "brute force" attack the profile manager or other resident applets managed within the eUICCs.

A dashboard allows the owner of the connected device to launch campaigns for one or a plurality of connected devices. The trusted proxy client 302 is programmed to "CALL HOME" at a given period of time to retrieve updates. Alternatively, the MNOHUB server can proactively request that the trusted proxy client 302 receive updates (i.e., push sessions). Automated network switching could then occur based on various heuristics built-into the connected device, as illustrated in FIGS. 6 and 7.

Turning now to FIG. 2, a hardware component block diagram of an example S2oC architecture is illustrated. The example S2oC architecture in FIG. 2 illustrates an integrated circuit that integrates all components of a computer system into a single die. The die is a small block of semiconducting material (using nm manufacturing process) produced from a wafer diced into small pieces. Each die contains a copy of the integrated circuit. The die contains a multi-core processor 202, a cellular modem (shown in FIGS. 2 and 3 as virtual cellular modem (VCM) 204 and VCM 306, respectively, although in some embodiments it should be understood that the cellular modem may include its own dedicated hardware element) and virtual subscribed identity modules (SIMs) for cellular connectivity. It is important to emphasize that, in an example S2oC architecture, all components reside on a single chip substrate. The virtual SIM cards are contained in an on-die eUICC (e.g., on-die hardware-based eUICC 206 and/or on-die software-based eUICC 208) connected to the multi-core processor 202 via the VCM 204. In this regard, while hardware-based eUICC 206 includes a dedicated physical element electrically connected to the multi-core processor 202, software-based eUICC 208 includes only a logical connection to the multi-core processor 202. It should be understood, of course, that some alternative embodiments may utilize an off-die cellular modem and/or off-die eUICC.

The multi-core processor 202 may, in some embodiments, include a central processing unit and a program read-only memory for storing instructions for the functions to be executed by the multi-core processor.

The VCM 204 may be integrated within the multi-core processor 202 and, as noted above, the VCM 204 is connected to the eUICC. In some embodiments, the trusted baseband client of the S2oC architecture manages the VCM 204, which provides the logic for the master layer. In turn, the eUICC hosts the profile manager, which provides the logic for the slave layer.

The VCM 204 is described as a software-based modulator-demodulator (modem) device which allows communication of the connected device over a cellular network. As such, the VCM 204 uses a special driver that allows this communication. The VCM Interpreter processes all commands originating from the multi-core processor 202. In its most basic form, the VCM 204 supports standard AT style commands as specified in ETSI GSM 07.07/3GPP TS 27.007 for controlling a GSM phone or modem. However, in some embodiments the VCM 204 also includes special purpose commands used in a different operation mode.

In some embodiments, the S2oC architecture integrates the modem functionality into an application processor of the multi-core processor, in which case an improved communication protocol is introduced to maximize the benefits of the integration. Alternatively, in other embodiments the modem functionality may be executed by a baseband processor of the multi-core processor.

The VCM's software may be based on the trusted baseband client, which is running in one single multi-core processor 202 using a real-time OS stack. The trusted baseband client is optimized so it can run in parallel with the trusted proxy client 302 while sharing computing processing resources. The multi-SIM, multi-band nature of the VCM 204 allows the connected device to run—in parallel—various communication sessions through multiple cell towers and networks. The dynamic measurement of various signal strengths also allows fetching of the optimal virtual SIM card from the trusted virtual store.

The VCM communication protocol is described as providing a higher-level abstraction of AT commands.

AT commands have been used since 1981 and still consist of a series of short text strings which are combined together to produce complete commands for operations such as dialing, hanging up, and changing the parameters of a connection. However, many vendors have introduced advanced proprietary features that extend basic AT commands. Implementing these proprietary features or any standard AT command in Android for instance, requires the OEM to provide an implementation of the Radio Interface Layer (ML) interface (ril.h). To do this, an OEM would provide a library (ril.so) that implements such interface.

However, it has been observed that ML integration is very complicated and programmers historically have continued to utilize AT commands in source code, which produces inflexibility. Accordingly, by virtualizing the modem, a more elegant approach is contemplated herein whereby the modem commands are abstracted from the integrator using an interface defined in the VCM communication protocol.

For illustrative purposes, the multi-core processor could send ISO 7816-4 APDU commands to the eUICC via the VCM 204 using AT+CSIM structured commands.

Some example commands:

SELECT 3F00—MASTER FILE ID

[CMD=AT] [INS=CSIM] [DATA=A0A40000023F00]

SELECT 6F07—IMSI FILE ID

[CMD=AT] [INS=CSIM] [DATA=A0A40000026F07]

READ 6F07—CONTENT of IMSI FILE

[CMD=AT] [INS=CSIM] [DATA=A0B0000009]

As contemplated herein, a new mode of operation is contemplated herein whereby a non-exhaustive pseudo-code example of an interface for the VCM 204 could include the following commands:

```
solicited_call (int virtualSIMCardID, BYTE* toMSISDN, int length);
unsolicited_call (int virtualSIMCardID, BYTE* fromMSISDN, int length);
openChannel (int virtualSIMCardID);
readIMSI (int virtualSIMCardID);
exchangeAPDU (int virtualSIMCardID, BYTE* commandAPDU, int length);
closeChannel (int virtualSIMCardID);
passThrough (BYTE* atCommand, int length);
```

Since the connection between the multi-core processor 202 and the VCM 204 is logical, it is more convenient to utilize a high-level interface for integration purposes. It is also noted the VCM 204 could be running a Java Card Connected Edition Virtual Machine (VM) and hence the trusted baseband client could also be a Java application. The Java Card Connected Edition features a new VM and an enhanced execution environment with network-oriented features. Applications can be developed as classic card applets requested by ISO 7816 APDU commands or as servlets using HTTP to support web-based schemes of communication with the eUICC.

An IntentService-like mechanism as described in the Android framework is used where all the (asynchronous) messages between the multi-core processor applications (including the trusted proxy client 302) and the VCM 204 are abstracted. Alternatively, the VCM 204 may expose its services with an API. The API could be defined in a .vcml file. In a Java programming language environment, for instance, the .vcml file is essentially an interface file with all methods (functions) of the VCM described. If implemented in the C language, it could be a .h (header) file. For this latter variation, the Android framework would use Java Native Interface (JNI) to communicate with the VCM 204.

It is important to note that in such embodiments all messages would be generally asynchronous (e.g., the multi-core processor applications will not immediately receive responses to given function calls). Because the trusted baseband client may run in a different OS instance (e.g., real-time Linux), messages are therefore queued to a virtualized bus system 308.

The virtual bus system 308 may be configured to be aware of all attached and running OS instances (Android OS, Baseband OS). The virtual bus system 308 can then forward messages by identifying the sender OS and the recipient OS. All running OS instances are attached to the virtual bus system 308 and permanently listen to messages. Accordingly, in some implementations, all major components may be virtualized. The "SIM-less mode" potentially allows therefore a complete virtualization of the application, baseband and eUICC software all running in one single processor. Such integration could improve the time-to-market for connected devices while optimizing the manufacturing process and reducing the overall cost of ownership of the connected device.

The VCML (Virtual Cellular Modem Language) file lists all services the VCM 204 can provide. For security purposes, only authorized applications can access the VCM framework. In some embodiments, this security measure is further enforced by not exposing the framework in the Android public APIs.

The authorized multi-core processor applications will then bind to the Service and implements the APIs. For backward compatibility purposes, the VCM 204 can also handle basic AT commands through a pass-through mode.

Turning now to FIG. 5, an example routing procedure is described for VCM-based communication. The operations described in FIG. 5 may, for instance, be performed by the connected device (e.g., an IoT device) and may utilize the multi-core processor 202 and/or the other elements described above in association with FIGS. 2 and 3.

In operation 502, the virtual bus system 308 may receive communications from one or more attached components of the S2oC. In operation 504, the VCM 306 may determine whether the communication is an AT command or not. In an instance in which the communication is an AT command, the command may be forwarded using a pass-through mode of operation in operation 506, in which case the procedure advances to operation 512, where the AT command is subsequently processed. Alternatively, in an instance in which the communication is not an AT command, the procedure advances to operation 508, in which it is determined whether the communication is a service call. If not, then the procedure returns to operation 502. If so, however, then the procedure advances to operation 510, in which the service call is translated into one or more AT commands. Subsequently, the procedure advances to operation 512, in which the one or more AT commands are processed.

Turning next to FIG. 6, an example procedure is illustrated for automated network switching, in accordance with example embodiments described herein. In operation 602, the trusted baseband client of a connected device selects a first network associated with MNO 1. In operation 604, the trusted baseband client determines that the signal from the first network is weak, and therefore performs a network scan to identify another network with a stronger signal, such as a second network associated with MNO 2. Subsequently, in operation 606, the trusted baseband client fetches a new virtual SIM card associated with MNO 2, which can be installed by the connected device to facilitate access to the second network having the stronger signal. Finally, in operation 608, the trusted baseband client is switches its connection to the second network, which is associated with MNO 2.

Turning next to FIG. 7, an example procedure is provided that illustrates a sequence flow for an automated network switching procedure. The operations described in FIG. 7 may, for instance, be performed by the connected device (e.g., an IoT device) and may utilize the multi-core processor 202 and/or the other elements described above in association with FIGS. 2 and 3.

In operation 702, the connected device polls for a list of neighboring towers to determine signal strengths associated with a plurality of MNO networks. In operation 704, based on the poll results, the connected device determines whether a currently installed virtual SIM card is associated with the best network (e.g., the network having the strongest signal strength, cheapest cost, or the like). In an instance in which a virtual SIM card is installed that is associated with the best network, then in operation 706 that virtual SIM card is activated, and the procedure advances to operation 712 to switch to the best network. Alternatively, in an instance in which a virtual SIM card has not been installed, then the procedure advances to operation 708, in which it is determined whether the connected device can purchase a virtual SIM card associated with the best network. If not, then the procedure returns to operation 702 to identify another network to evaluate. If so, however, then the procedure advances to operation 710, in which the connected device purchases a new SIM card associated with the best network. Subsequently, the procedure advances to operation 712, in which the connected device switches to the best network.

As described herein, example embodiments include apparatuses, systems and a set of methods for configuring a "SIM-less" System-on-Chip (S2oC) with integrated reprogrammable cellular network connectivity. However, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a processor;
   a software-based embedded Universal Integrated Circuit Card (eUICC) that does not include a dedicated physical element; and
   one or more memories storing computer-executable instructions that, when executed by the processor, configure the apparatus to communicate with a plurality of cellular networks using a cellular modem and one or more virtual subscriber identity module (SIM) cards stored in the software-based embedded eUICC.

2. The apparatus of claim 1, wherein the software-based embedded eUICC comprises an on-die eUICC.

3. The apparatus of claim 1, further comprising a virtual bus system configured to transmit communications between a plurality of processor applications using a high-level programming interface.

4. The apparatus of claim 3, the virtual bus system being configured to transmit communications between a plurality of applications.

5. The apparatus of claim 1, wherein the one or more memories further store computer-executable instructions that, when executed by the processor, cause the apparatus to self-provision virtual SIM cards accessible over-the-air by cellular network operators.

6. The apparatus of claim 5, wherein the apparatus is assigned a unique random cryptographic key only known by a remote server upon registration of a chip that has the processor.

7. The apparatus of claim 1, wherein the one or more memories further store computer-executable instructions that, when executed by the processor, cause the apparatus to dynamically switch cellular networks without human intervention.

8. The apparatus of claim 7, wherein the computer-executable instructions, when executed by the processor cause
   the dynamically switching is performed by at least switching from a network that the apparatus is connected, in response to a determination that a network connection to the network is undesirable,
   where the determination is performed while connected to the network via the network connection.

9. The apparatus of claim 1, wherein the cellular modem receives commands using an interface defined in a virtual cellular modem (VCM) communication protocol.

10. The apparatus of claim 1, wherein the processor is a multi-core processor.

11. The apparatus of claim 1, wherein the apparatus is assigned a unique random cryptographic key only known by a remote server upon registration of a chip that has the processor.

12. An apparatus comprising:
a processor;
a software-based embedded Universal Integrated Circuit Card (eUICC) that does not include a dedicated physical element; and
one or more memories storing computer-executable instructions that, when executed by the processor, configure the apparatus to communicate with a plurality of cellular networks using a cellular modem and one or more virtual subscriber identity module (SIM) cards stored in the software-based embedded eUICC;
wherein the one or more memories further store computer-executable instructions that, when executed by the processor, cause the apparatus to self-provision virtual SIM cards accessible over-the-air by cellular network operators, and
wherein the computer-executable instructions, when executed by the processor, cause the apparatus to self-provision virtual SIM cards accessible over-the-air by cellular network operators using a local certificate stored in the software-based embedded eUICC.

13. A mobile terminal having an integrated circuit chip including a processor, a software based embedded Universal Integrated Circuit Card (eUICC) that does not include a dedicated physical element, and one or more memories, the mobile terminal including:
means for communicating with a plurality of cellular networks using one or more virtual subscriber identity module (SIM) cards stored in the software-based embedded eUICC of the mobile terminal.

14. The mobile terminal of claim 13, wherein the software based embedded eUICC comprises an on-die eUICC.

15. The mobile terminal of claim 13, further comprising:
means for transmitting communications between a plurality of processor applications using a high-level programming interface.

16. The mobile terminal of claim 13, further comprising:
means for self-provisioning virtual SIM cards accessible over-the-air by cellular network operators.

17. The mobile terminal of claim 16, wherein the means for self-provisioning the virtual SIM cards accessible over-the-air by cellular network operators uses a local certificate stored in the software-based embedded eUICC.

18. The mobile terminal of claim 16, wherein said integrated circuit chip is assigned a unique random cryptographic key only known by a remote server upon registration of said chip.

19. The mobile terminal of claim 13, further comprising:
means for dynamically switching between cellular networks without human intervention via activation of a corresponding virtual SIM card of the one or more virtual SIM cards stored in the software-based embedded eUICC,
wherein the means for dynamically switching performs the switching from a network that the apparatus is connected in response to a determination that a network connection to the network is undesirable, where the determination is performed while connected to the network via the network connection.

20. The mobile terminal of claim 13, wherein the cellular modem is configured to receive commands using an interface defined in a virtual cellular modem (VCM) communication protocol.

21. A mobile terminal comprising:
a processor;
a software-based embedded Universal Integrated Circuit Card (eUICC) that does not include a dedicated physical element; and
one or more memories storing computer-executable instructions that, when executed by the processor, configure the mobile terminal to communicate with a plurality of cellular networks using (i) a cellular modem comprising a software-based modulator-demodulator device which allows communication by a connected device over a cellular network and (ii) one or more virtual subscriber identity module (SIM) cards stored in the software-based embedded eUICC.

22. A mobile terminal comprising:
a processor;
a virtual Universal Integrated Circuit Card (eUICC) that does not include a dedicated physical element; and
one or more memories storing computer-executable instructions that, when executed by the processor, configure the mobile terminal to communicate with a plurality of cellular networks using (i) a cellular modem comprising a software-based modulator-demodulator device which allows communication by a connected device over a cellular network and (ii) one or more virtual subscriber identity module (SIM) cards stored in the virtual eUICC.

23. The mobile terminal of claim 22, wherein the virtual eUICC comprises an on-die eUICC.

24. An apparatus comprising:
a processor;
a software-based embedded Universal Integrated Circuit Card (eUICC) that does not include a dedicated physical element; and
one or more memories storing computer-executable instructions that, when executed by the processor, configure the apparatus to communicate with a plurality of cellular networks using a cellular modem and one or more virtual subscriber identity module (SIM) cards stored in the software-based embedded eUICC,
wherein the computer-executable instructions, when executed by the processor, cause the apparatus to self-provision virtual SIM cards accessible over-the-air by cellular network operators using a local certificate stored in the software-based embedded eUICC.

* * * * *